United States Patent
Chawdhuri et al.

(10) Patent No.: US 10,509,803 B2
(45) Date of Patent: Dec. 17, 2019

(54) SYSTEM AND METHOD OF USING REPLICATION FOR ADDITIONAL SEMANTICALLY DEFINED PARTITIONING

(71) Applicant: Talentica Software (India) Private Limited, Pune (IN)

(72) Inventors: Debasish Ray Chawdhuri, Pune (IN); Abhinav Nigam, Pune (IN); Manjusha Madabushi, Pune (IN)

(*) Notice: Subject to any disclaimer, the term of this patent is extended or adjusted under 35 U.S.C. 154(b) by 222 days.

(21) Appl. No.: 15/435,209

(22) Filed: Feb. 16, 2017

(65) Prior Publication Data

US 2017/0235809 A1 Aug. 17, 2017

(30) Foreign Application Priority Data

Feb. 17, 2016 (IN) .............................. 201621005538

(51) Int. Cl.
*G06F 16/00* (2019.01)
*G06F 16/27* (2019.01)

(52) U.S. Cl.
CPC ................. *G06F 16/278* (2019.01)

(58) Field of Classification Search
CPC .. G06F 17/30584; G06F 16/178; G06F 16/27; G06F 16/278; H04L 67/32
See application file for complete search history.

(56) References Cited

U.S. PATENT DOCUMENTS

| | | | | |
|---|---|---|---|---|
| 8,037,024 B1* | 10/2011 | Bozkaya | ............... | G06F 16/275 707/637 |
| 9,875,272 B1* | 1/2018 | Jhingran | ............. | G06F 16/2365 |
| 2012/0110150 A1* | 5/2012 | Kosuru | ................. | H04L 41/082 709/221 |
| 2012/0254175 A1* | 10/2012 | Horowitz | .......... | G06F 17/30584 707/737 |
| 2013/0124466 A1* | 5/2013 | Naidu | ..................... | G06F 8/453 707/610 |
| 2013/0290249 A1* | 10/2013 | Merriman | ......... | G06F 17/30578 707/610 |
| 2014/0032579 A1* | 1/2014 | Merriman | ............. | G06F 16/258 707/756 |
| 2014/0289197 A1* | 9/2014 | Webber | ................ | G06F 16/275 707/632 |
| 2014/0372489 A1* | 12/2014 | Jaiswal | ............... | G06F 16/2365 707/812 |
| 2014/0372702 A1* | 12/2014 | Subramanyam | .... | G06F 12/0848 711/129 |
| 2016/0203174 A1* | 7/2016 | Shahane | ............. | G06F 16/2228 707/803 |
| 2016/0371353 A1* | 12/2016 | Serafini | ................. | G06F 9/5061 |
| 2017/0075965 A1* | 3/2017 | Liu | ......................... | G06F 16/27 |

(Continued)

*Primary Examiner* — Noosha Arjomandi
(74) *Attorney, Agent, or Firm* — Wiley Rein LLP

(57) ABSTRACT

Disclosed is a storage efficient multi-key sharding approach for use in a data management system. The data residing on the data management system can be partitioned based on multiple columns independently of one another, thus providing faster querying on each of the columns used for partitioning. The more partitioning attributes other than the key attribute of data records in the data records being partitioned can be used. Specifically, a multi-key partitioning approach consistent with embodiments described herein can be applied to perform load balancing between multiple parallel servers or server processes.

10 Claims, 7 Drawing Sheets

(56) References Cited

U.S. PATENT DOCUMENTS

2017/0091327 A1\* 3/2017 Bostic ............... G06F 17/30864
2017/0249246 A1\* 8/2017 Bryant ................ G06F 12/0261
2019/0179832 A1\* 6/2019 Nam ..................... G06F 16/278

\* cited by examiner

SYSTEM AND METHOD OF USING REPLICATION FOR ADDITIONAL SEMANTICALLY DEFINED PARTITIONING

RELATED APPLICATIONS

This Application claims priority benefit of Indian Application No. 201621005538, filed Feb. 17, 2016, which application is incorporated entirely by reference herein for all purposes.

FIELD OF INVENTION

The present invention relates to data management systems, and more particularly, the present invention relates to a system and method for storage efficient multi-key sharding approach for use in data management systems.

BACKGROUND OF THE INVENTION

In recent years, amount of data being handled by data management systems has increased by a much higher rate than the increase in storage capacity of storage mediums. The data management systems have evolved to cope with this phenomenon by distributing data over multiple servers. This distribution is accompanied by various techniques for different aspects of data management. One of them being sharding. Sharding is a type of distribution that minimizes query time for predetermined queries. Replication is a technique utilized to provide fault tolerance in a distributed data management system, by having multiple copies of data residing in different servers.

A database program or a data management system generally displays data as two-dimensional tables, of columns and rows. However, data are typically stored as one-dimensional strings. A row-based store typically serializes the values in a row together, then the values in the next row, and so on.

Currently available relational database management systems accomplish partitioning based on specified criteria applied to split the database. In general, a partitioning key is used to assign a partition based on certain criteria. Commonly used approaches include range partitioning, list partitioning, hash partitioning, round robin partitioning, and composite partitioning. In range partitioning, a partition can be defined by determining if the partitioning key is inside a certain range. For example, a partition can be created to include for all rows in which values in a column of postal codes are between 70000 and 79999.

In list partitioning, a partition can be assigned a list of values and the partition can be chosen if the partitioning key has one of the values on the list. For example, a partition built to include data relating to Nordic countries can includes all rows in which a column of country names includes the text string values Iceland, Norway, Sweden, Finland, Denmark and the like. In hash partitioning, the value of a hash function can determine membership in a partition. For example, for a partitioning scheme in which there are four partitions, the hash function can return a value from 0 to 3 to designate one of the four partitions. Round robin partitioning can be used to distribute storage and/or processing loads among multiple data partitions and/or servers or server processes according to a pre-set rotation among the available partitions or servers or server processes. As an example, a first data unit can be directed to a first partition of three partitions, a second data unit to the second partition, a third data unit to the third partition, a fourth data unit to the first partition, and so forth. In composite partitioning, certain combinations of other partitioning schemes can be allowed, for example by first applying a range partitioning and then a hash partitioning.

Data replication refers to storing the same data on multiple storage devices. Current systems for processing data for calculation of metrics take two different approaches. In one approach, known as batch processing, data is equally and arbitrarily distributed among the different servers and then the computation is done in two stages, known as the map stage and the reduce stage. In the map stage, each server does all the processing that can be done on per-row basis and in the reduce stage, the remaining computation is done. This requires that the data taking part in the calculation of the same key value be moved to the same server after map stage and before reduce stage. The process of moving data between map and reduce stages is called shuffle stage. In case of certain kind of metrics, an additional stage, called a combination stage, can improve performance by reduction of network traffic during shuffle. The combination stage is very similar to the reduction stage and can be called a local reduction stage in which the data is processed in the server where the map had finished running. Some well known systems taking this approach are Hadoop and Spark. They also provide a resilient storage, known as HDFS, that, by means of replication of data, enables the computation to continue in case a few servers fail. However, the recovery may only work up to a maximum number of failures, which is one less than that of the replication factor/that is the number of copies of the data that is saved The second approach is to distribute the data in a way so that the data related to one value of a column remains on one server. This way, shuffle is no longer necessary before reduction. However, the distribution is only allowed according to one single column or a combination of columns grouped as a single column. The replication is achieved by making identically partitioned copies. A subset of these systems is stream processing systems which do not deal with storage of data. That is to say, if a server fails, the data needs to be reprocessed in the system.

Conventional database systems allow partitioning of a row based on a primary key (partitioning key). This is equivalent to partitioning data along one dimension. This is problematic because if queries along multiple dimensions are run against such a system or a group by is done along a dimension that is different from the partition dimension then it leads to a lot of data movement across nodes and there by reducing the overall performance of the queries.

Accordingly, there exists a need to provide system and method for storage efficient multi-key sharding approach for use in a data management system.

OBJECTS OF THE INVENTION

The object of the present invention is to provide a means to maintain resilience of the data by replication and sharding the replicas differently to achieve sharding by multiple dimensions. When a row is added to the system, the replicas are partitioned along multiple dimensions thus minimizing the data movement across nodes.

SUMMARY OF THE INVENTION

Generally in data management systems, multiple computations, each of a different kind, are done on the same data. Each kind of computation may require a different way of sharding the data among all the servers. There is also the requirement of a means to maintain resilience of the data by replication of the data. The current subject matter deals with a method of sharding the additional replicas differently to improve the query performance.

In variations of the current subject matter, the following features can optionally be included in any feasible combination. The method of sharding can optionally be one of range partitioning, list partitioning or hash partitioning. The values of the column on which sharding is done can optionally be unique or non unique. The rows corresponding to one partition of data can reside on more than one server, in case when the rows cannot fit in the storage medium of one server.

Implementations of the current subject matter can include, but are not limited to, systems and methods consistent including one or more features are described as well as articles that comprise a tangibly embodied machine-readable medium operable to cause one or more machines (e.g., computers, etc.) to result in operations described herein. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

DETAILED DESCRIPTION OF THE INVENTION

The foregoing objects of the invention are accomplished and the problems and shortcomings associated with prior art techniques and approaches are overcome by the present invention described in the present embodiment.

The present invention provides a storage efficient multi-key sharding approach for use in a data management system. The data residing on the data management system can be partitioned based on multiple columns independently of one another, thus providing faster querying on each of the columns used for partitioning. The more partitioning attributes other than the key attribute of data records in the data records being partitioned can be used. Specifically, a multi-key partitioning approach consistent with embodiments described herein can be applied to perform load balancing between multiple parallel servers or server processes.

The sharding approach for different sharding columns can be different. In one example, the sharding approach for the first column, which is a primary key column, can be hash partitioning and the second column can be partitioned using range partitioning or list partitioning. Other partitioning approaches, for example round robin partitioning, do not assign data to partitions according to any structure that can improve the speed with which data can be retrieved.

This present invention is illustrated with reference to the accompanying drawings, throughout which reference numbers indicate corresponding parts in the various figures. These reference numbers are shown in bracket in the following description.

Figure 1:
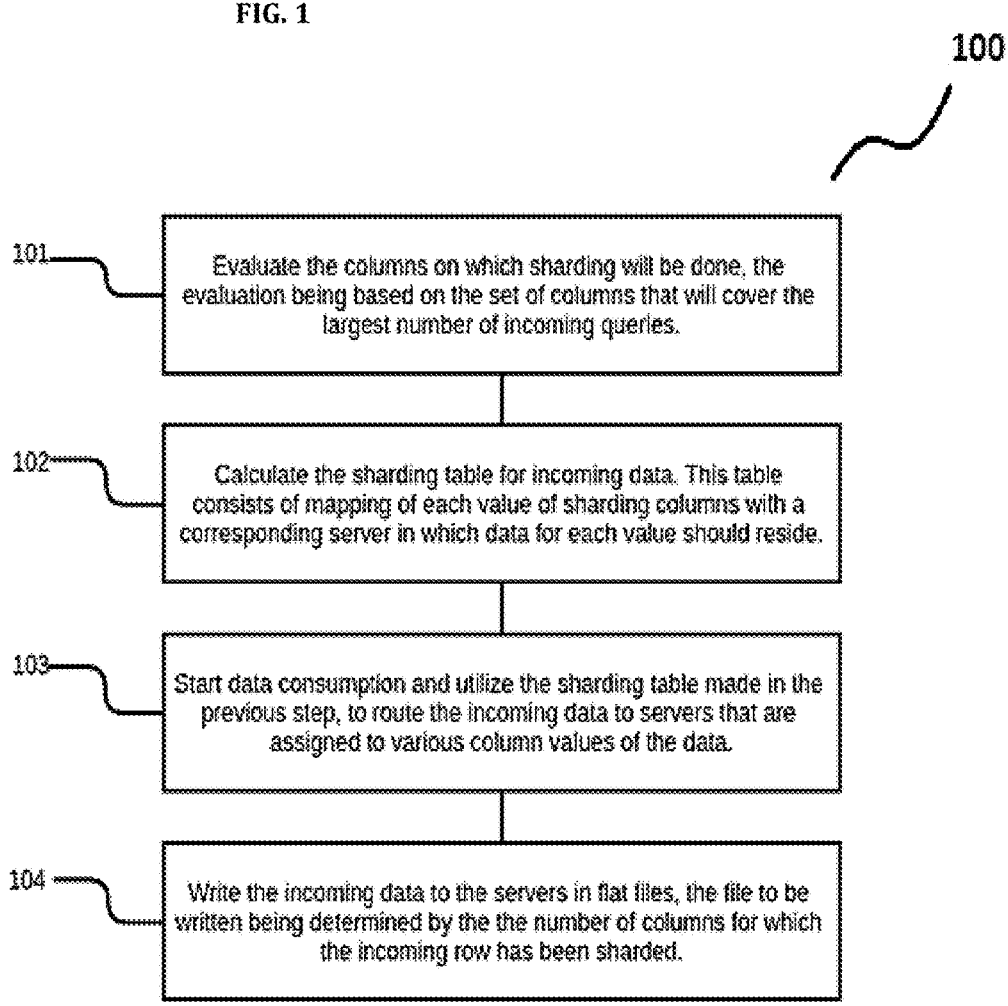
FIG. 1 shows a method for replication for additional semantically defined partitioning of data, in accordance with the present invention.

Referring to FIG. 1, there is shown a computer implemented method (100) for replication for additional semantically defined partitioning of data, in accordance with the present invention. At (101), the method (100) includes making a decision about which columns is to be used for sharding the data. The decision of selecting column for sharding is driven by use cases. The step (101) further includes pre-emptively determining the queries that can be served by the system, and then evaluating the set of sharding columns such that most of the queries will have at least 1 column in the set.

At (102), the method (100) includes calculating incoming data for the sharding table. For this, a representative sample of the data is first extracted from the incoming data. This is followed by calculation of the relative frequency of occurrence of each value in the sharding columns. Finally, based on the relative frequencies, each of these column values are then assigned one of the available servers, optimizing for similar amounts of data residing on each server. In an embodiment, the sharding table can also be calculated dynamically as the data flows through the system, wherein, the sharding can change as the column-value wise distribution of the incoming data changes.

At (103), the method (100) includes reading the incoming data row by row, and evaluating the server to which the incoming data belongs, based on the value of sharding columns for each row. This step starts when the actual data flow starts and the system starts consuming it At (104), the method (100) includes writing the data of the step (103), out to flat files on the servers that were provided by sharding table. There are multiple files residing on the server, and the file to write to is determined by how many columns of the incoming row match the sharding table for that server.

In an embodiment, the data is sent by the clients to a cluster of servers, known as the accumulation cluster. The job of the accumulation cluster is to receive data in a fault tolerant manner, and to route the data to the storage servers based on the sharding table.

Figure 2:
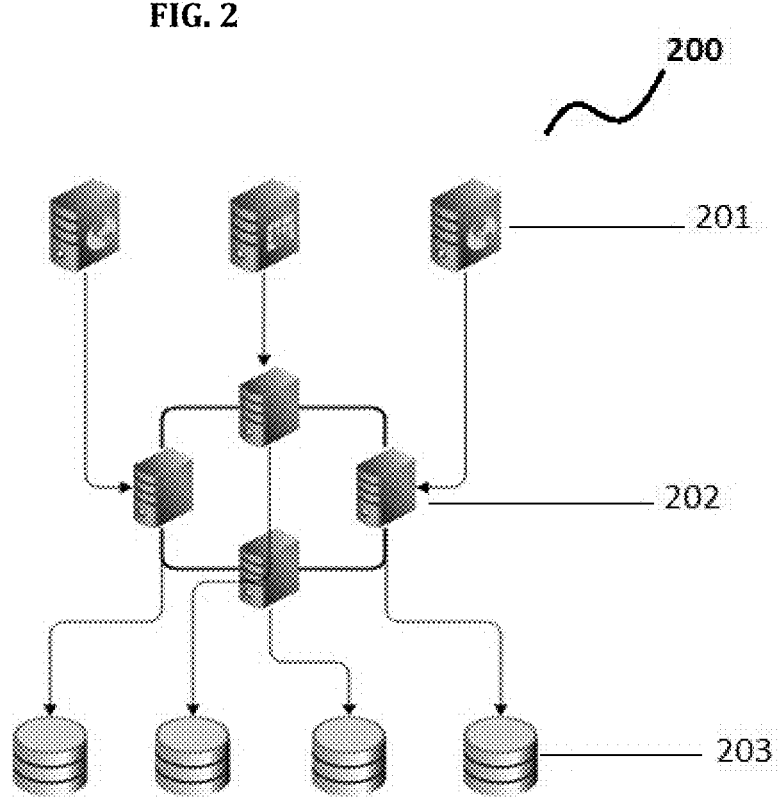
FIG. 2 shows a system of using replication for additional semantically defined partitioning, in which the data is sent by the clients to a cluster of servers known as the accumulation cluster, in accordance with the present invention.

Referring now to FIG. 2, there is shown a system (200) of using replication for additional semantically defined partitioning. The system (200) includes a plurality of clients (201), a plurality of accumulation cluster (202) (alternatively referred as cluster of servers (202)) and a plurality of database servers (203).

The clients (201) includes list of servers i.e. cluster of server (202) used for accumulation configured therein, and are able to send data to any of those. In an embodiment, the system (200) may include a load balancing servers for accumulation server/cluster of server (202), in which case clients (201) send data to load balancer and then load balancer routes it to one of the servers in accumulation cluster (202).

Figure 3:
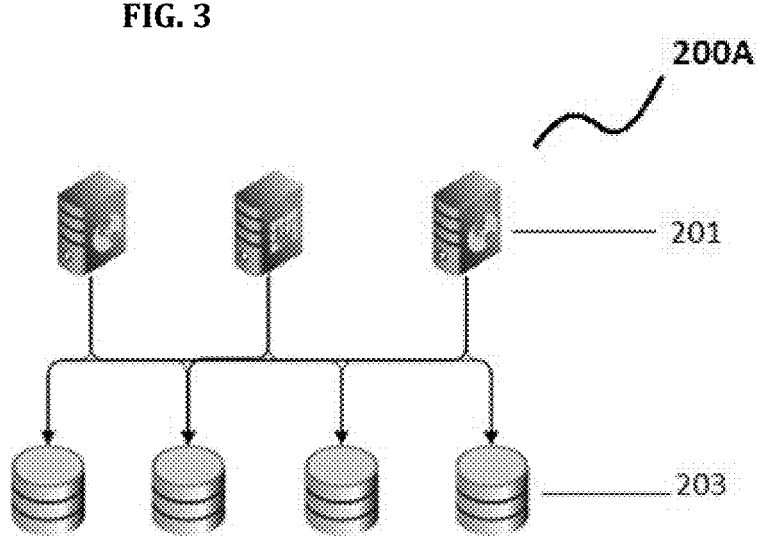
FIG. 3 shows an embodiment of the system of FIG. 2.

In an embodiment of the system (200), a module for sharding resides on the accumulation servers (202). FIG. 3 shows the system (200A) wherein sharding table is provided to the clients (201) themselves. When sending data, clients (201) evaluate a server of the plurality of database servers (203) on which the data should be sent using the sharding table. The embodiment discussed can be implemented in the system (200) when it is possible to modify the clients (201) that are sending data.

Figure 4:
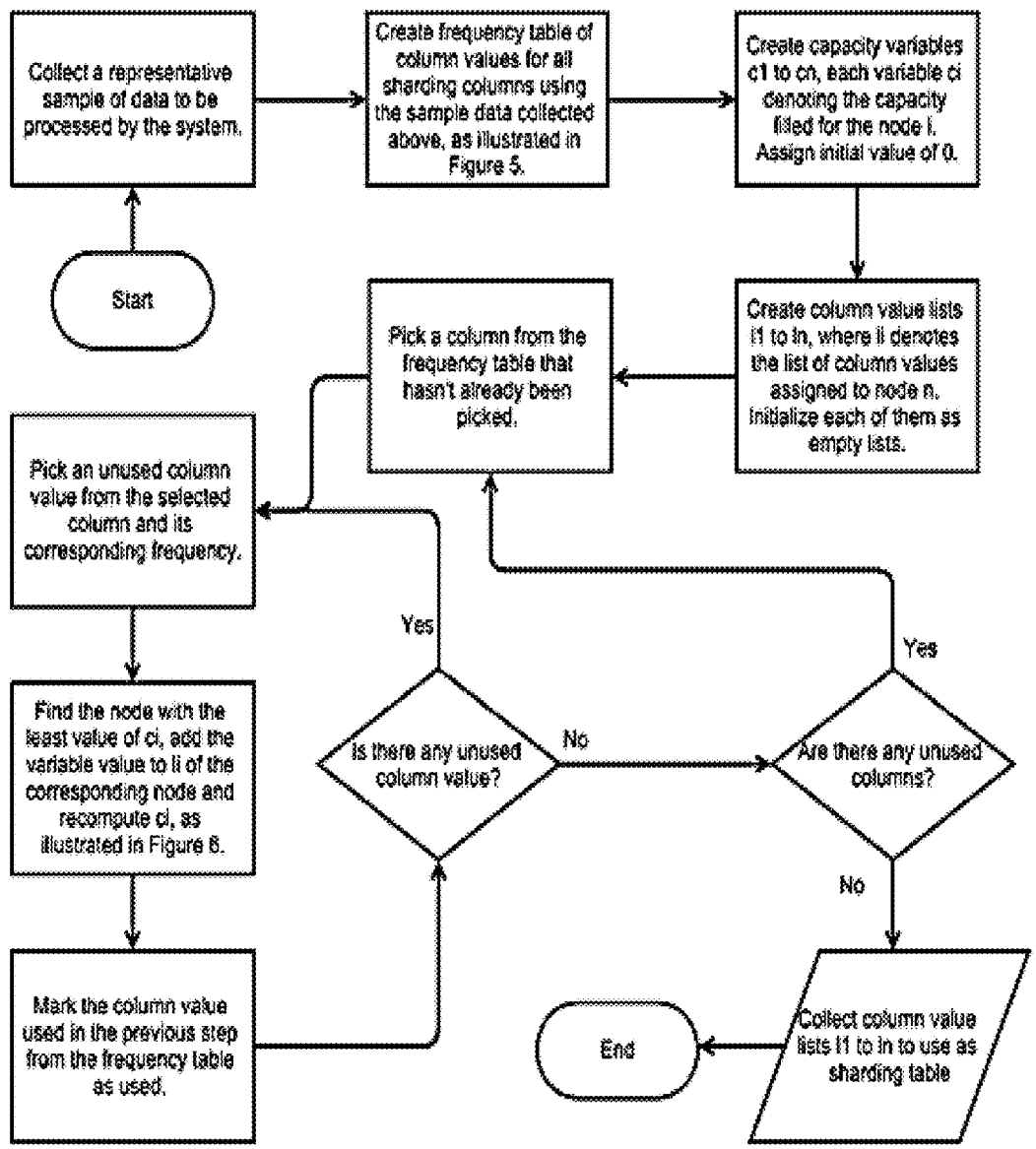
FIG. 4 shows a flowchart of the strategy to create the sharding table, in accordance with the present invention.
Figure 5:
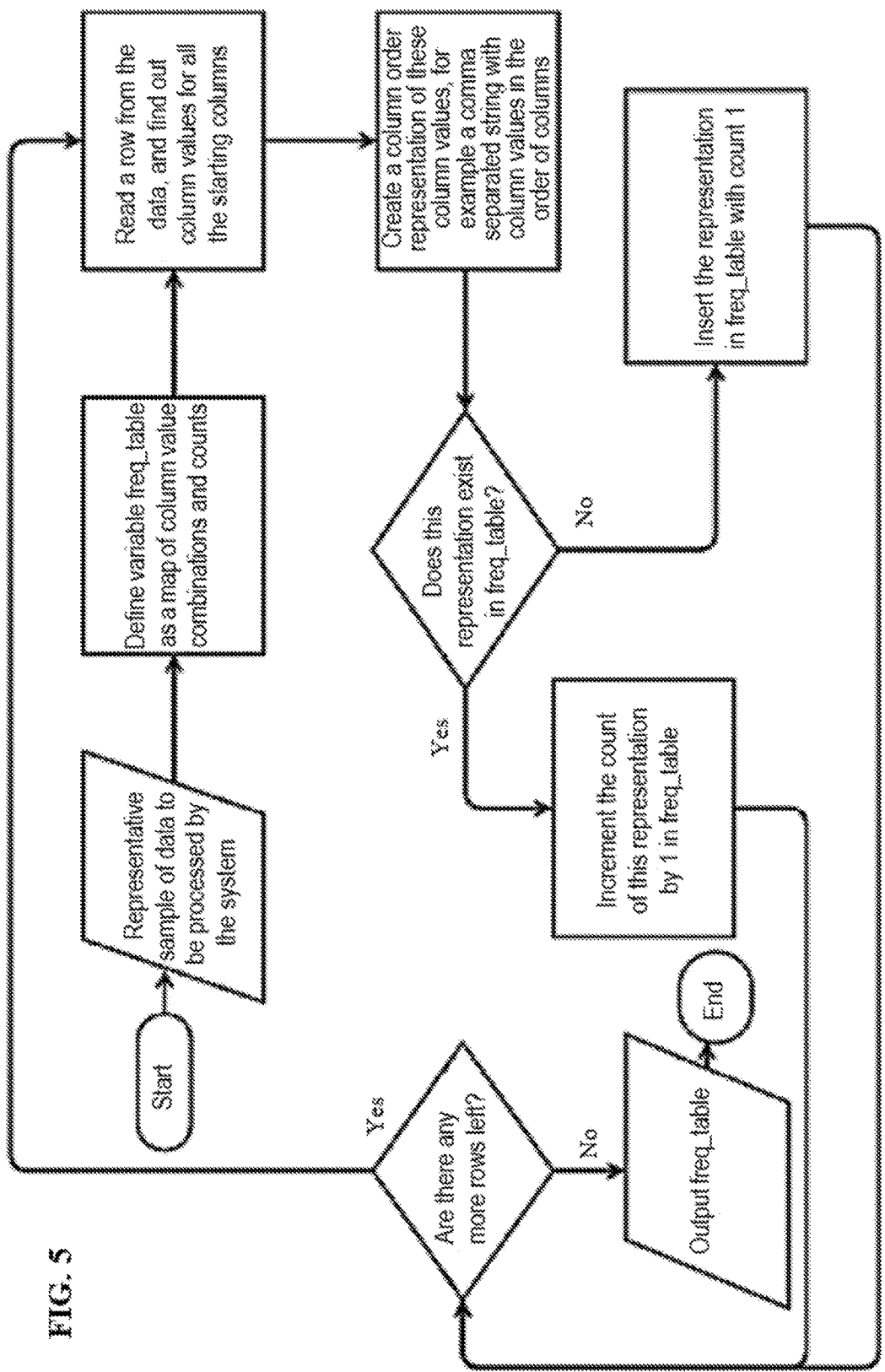
FIG. 5 shows a process flowchart for creation of the frequency table, to be used in the flowchart of FIG. 4.
Figure 6:
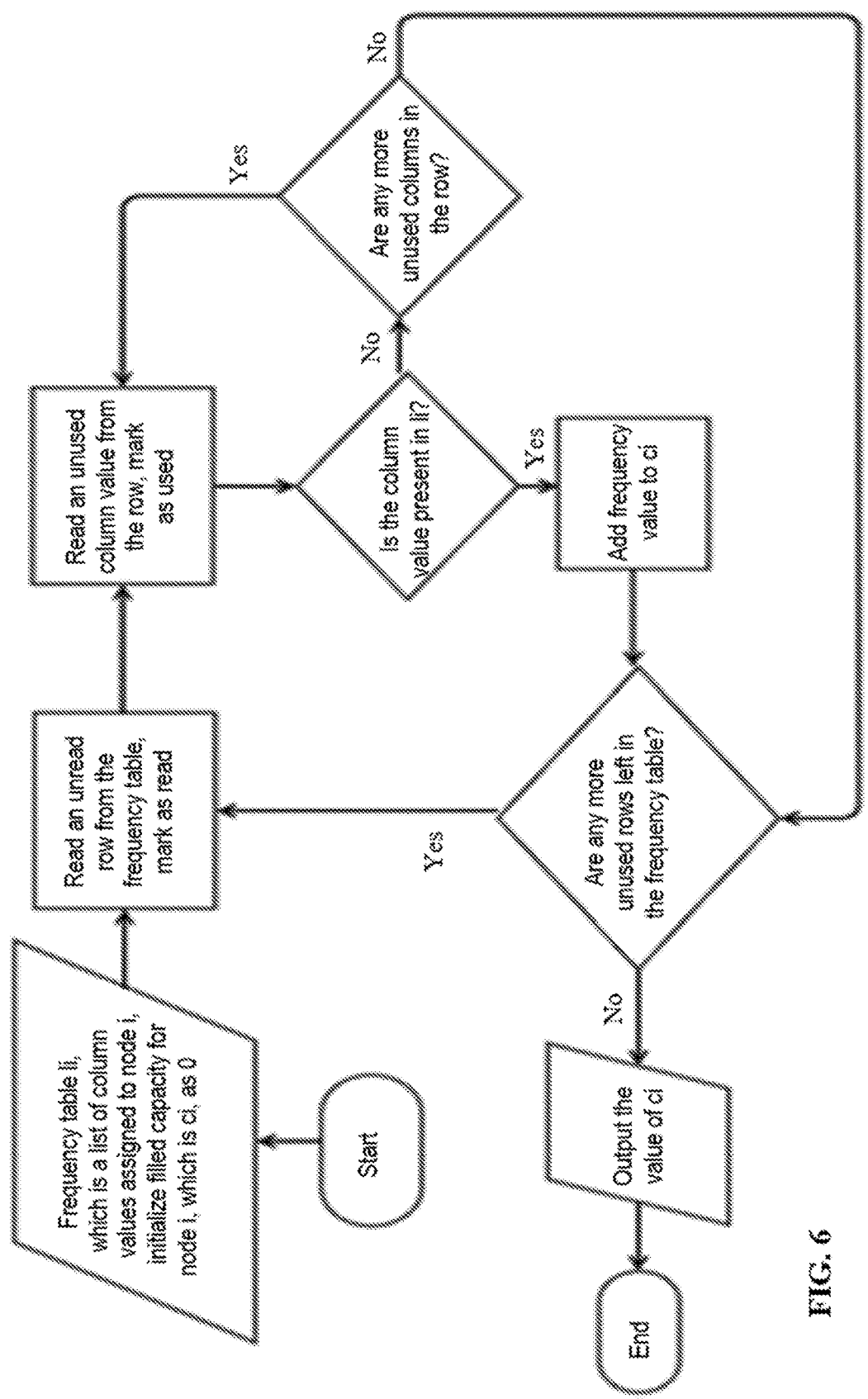
FIG. 6 shows a flowchart of a method of calculating the filled size of a server, given the column values that go to that server and the frequency table.
Figure 7:
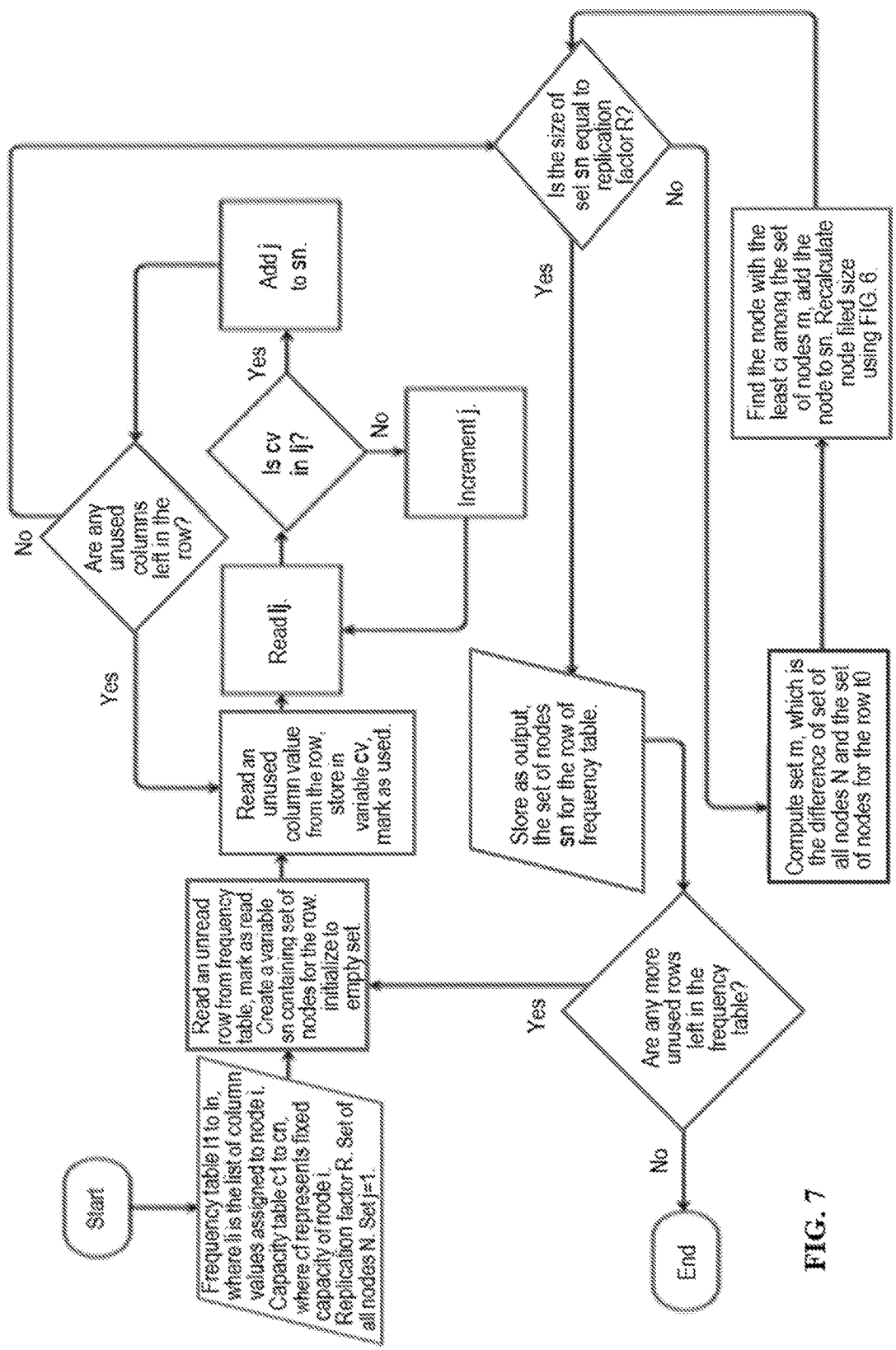
FIG. 7 illustrates a flowchart for finding out the under-replicated columns, and making a copy on suitable servers.

Referring to FIG. 4, there is shown a flowchart of a module to be followed for creation of sharding table. The module works on a representative sample of the real data. The output of this module is a sharding table, which contains a map of a number of servers assigned to each column value. It should be noted that the module ensures that the number of servers assigned to each value are exactly equal to the replication factor used, which in turn equal to the number of sharding columns is chosen. There are steps in this module that are concerned with calculation of frequency table as shown in FIG. 5 and computation of filled capacity of a server as shown in FIG. 6. There is also a step of ensuring replication factor R, and assigning servers to column values that are not spread across R servers, which is illustrated in FIG. 7.

FIG. 5 is the flowchart for calculation of frequency table as discussed in FIG. 4. The frequency table is a key tool to optimize for uniform distribution of data across all available servers, and thus achieve processing symmetry to a reasonable extent. The frequency table for column values is created by creating a representative sample from the incoming data, counting the number of times each sharding column value combination appears in the data, and then dividing each individual count by the total number of rows in order to normalize the counts. Once the frequency table is made, each available storage server is assigned a set of column values, optimized to have similar storage requirements for all servers. The algorithm works when all storages have equal storage capacity. Similar storage requirement optimization ensures that during querying, each storage server has nearly equal processing load, thus using the available hardware efficiently.

FIG. 6 shows the method of calculating the filled size of a server as discussed in FIG. 4. This information is useful while figuring out which server to choose for a particular column value during other algorithms. Also, it is complicated since when adding a new column value to a server, the change in filled size also depends on the column values that were already present in the server, as some of those column values data included the data of new column value.

Once all column values are assigned to a server, the next step is ensuring the replication factor holds for all column values. Most column values won't have the required replication factor in the previous step, as some of their data will go to the same server through every sharding strategy. This data is termed as the intersection data, and it requires special handling in the form of making a copy of this data on another server. FIG. 7 shows a module for finding out the under-replicated columns, and making a copy on suitable servers.

Figure 8:
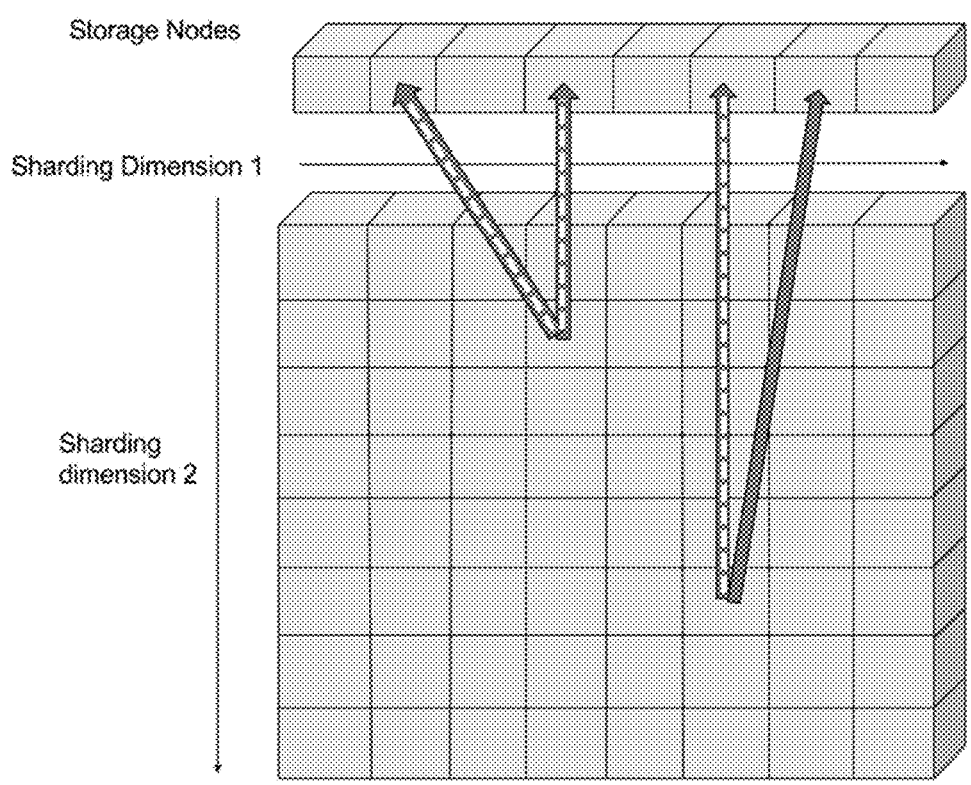
FIG. 8 illustrates core technique of sharding where the different replication copies are sharded differently.

Referring to FIG. 8, a schematic diagram is shown as to how different replication copies can be sharded differently. The central block represents one copy of the data. Since there are 2 replications, there are two copies, which are in this case superimposed one top of another. The horizontal and vertical lines represent two different sharding methods of dividing the data. This also divides the block of data into small boxes with coordinates. Once this division is done, each small part needs to be allocated to two different servers. If the horizontal and the vertical coordinates are different, each of the coordinate values gives the servers to be allocated to that part of the data (this is marked using yellow arrows). If they are same, one of the servers is equal to the coordinate value (marked with yellow arrow) and another copy is simply stored in any other server (marked with green arrow). Both these allocations are marked with arrows. This technique can be easily extended to any number of replication copies and an equal number of sharding methods.

Although the present invention mainly deals with computation of aggregate values, the approach and methodology of the present invention can also be applied to key values storage and even a relational database. By changing the storage component, it is possible to use the same sharding module to achieve sharding of the data on different database columns (or keys in case of key-value stores) by utilizing its replication copies. The dimensions will be replaced by the database columns.

Advantages of the present invention
1. The present invention allows using the replication copies to increase the speed of computation of multiple kinds of computations while still providing full advantage of replication as provided by existing systems.
2. With the use of the present invention, the data residing on the data management system can be partitioned based on multiple columns independently of one another, thus providing faster querying on each of the columns used for partitioning.
3. The multi-key partitioning approach of the present invention can be applied to perform load balancing between multiple parallel servers or server processes.

The foregoing descriptions of specific embodiments of the present invention have been presented for purposes of illustration and description. They are not intended to be exhaustive or to limit the present invention to the precise forms disclosed, and obviously many modifications and variations are possible in light of the above teaching. The embodiments were chosen and described in order to best explain the principles of the present invention and its practical application, to thereby enable others skilled in the art to best utilize the present invention and various embodiments with various modifications as are suited to the particular use contemplated. It is understood that various omission and substitutions of equivalents are contemplated as circumstance may suggest or render expedient, but such are intended to cover the application or implementation without departing from the spirit or scope of the present invention.

We claim:
1. A method using replication for additional semantically defined partitioning of data, using a computer program product to achieve sharding of data on multiple independent keys where the number of keys is equal to the replication factor while maintaining fault tolerance with no additional storage as compared to existing systems, the method comprising:

1) making a decision by at least one processor about which columns is to be used for sharding the data, wherein the decision of selecting column for sharding is driven by;
   a) the frequency served queries; and
   b) the set of independent sharding columns such that most of the queries will have at least one column in the set;
2) calculating the sharding table by at one processor based on
   a) the replication factor;
   b) the choice of columns; and
   c) a sample of the incoming data so as to make a decision on the columns by which the replicas need to be sharded; and
3) distributing and storing the data by at least one processor by
   a) reading the incoming data row by row;
   b) evaluating the server to which the incoming data belongs, based on the value of sharding columns in each row and the sharding table; and
   c) writing the data to flat files on the servers that were provided by the sharding table, wherein the data is sent by the clients to a cluster of servers, known as the accumulation cluster.

2. The method as claimed in claim 1, wherein accumulation cluster stores data in a fault tolerant manner while also sharding each replication copy independently allowing data to be queried on multiple independent keys.

3. The method as claimed in claim 1, wherein partition method comprises hash partitioning, and the partition criteria comprises a hash value calculated based on one or more values in one or more columns of the table.

4. The method as claimed in claim 1, wherein partition method comprises range partitioning, and the partition criteria comprises range values assigned to each of the plurality of storage servers.

5. The method as claimed in claim 1, wherein the partition method comprises list partitioning, and the partition criteria comprises list of column values assigned the each of the plurality of storage servers.

6. A system for replication for additional semantically defined partitioning of data to achieve sharding of data on multiple independent keys where the number of keys is equal to the replication factor while maintaining fault tolerance with no additional storage as compared to existing systems, the system comprising:
    at least one programmable processor; and
    a machine-readable medium storing instructions that, when executed by the at least one processor, causes the at least one programmable processor to perform operations comprising
    evaluating, based on values of one or more columns of a table, at least two partition criteria for the data record, when at least two replicas of the table are being stored on at least two servers;
    identifying at least two storage locations for a partition, the identifying comprising determining at least two of the servers to store the partition, based on the size of partition; and
    storing the data record in the identified servers based on the partition criteria.

7. The system as claimed in claim 6, wherein the partition method comprises hash partitioning, and the partition criteria comprises a hash value calculated based on one or more values in one or more columns of the table.

8. The system as claimed in claim 6, wherein the partition method comprises range partitioning, and the partition criteria comprises range values assigned to each of the plurality of storage servers.

9. The system as claimed in claim 6, wherein the partition method comprises list partitioning, and the partition criteria comprises list of column values assigned the each of the plurality of storage servers.

10. A method for replication and partitioning data to achieve sharding of the data on multiple independent keys where the number of keys is equal to a replication factor, the system comprising:
    by a processor, applying a first partitioning key to a data record in a first column of a table to create a first partitioning criterion;
    by the processor, applying a second partitioning key to the data record to create a second partitioning criterion;
    by the processor, assessing a size of a partition of the table;
    by the processor, identifying at least two storage locations for the partition of the table based on the size of the partition of the table, wherein the at least two storage locations comprise a first server and a second server, both servers being in communication with the processor;
    by the first server and by the second server, storing the data record in the server based on the first partition criteria and based on the second partition criteria.

* * * * *